United States Patent [19]

Hayashi et al.

[11] Patent Number: 5,572,496
[45] Date of Patent: Nov. 5, 1996

[54] APPARATUS FOR REPRODUCING AN ENCODED DIGITAL SIGNAL BASED ON A FRAME SYNCHRONIZATION SIGNAL

[75] Inventors: Hideki Hayashi; Masaru Umezawa, both of Tsurugashima, Japan

[73] Assignee: Pioneer Electronic Corporation, Tokyo, Japan

[21] Appl. No.: 455,616

[22] Filed: May 31, 1995

[30] Foreign Application Priority Data

Jun. 1, 1994 [JP] Japan .................................. 6-120097

[51] Int. Cl.$^6$ ................................................ H04N 5/76
[52] U.S. Cl. ................................................ 369/59
[58] Field of Search ..................... 369/48, 54, 58, 369/32, 59, 124; 360/39.1

[56] References Cited

U.S. PATENT DOCUMENTS

| | | | |
|---|---|---|---|
| 5,151,891 | 9/1992 | Bergmans | 369/59 |
| 5,392,268 | 2/1995 | Rokutan | 369/59 |
| 5,467,330 | 11/1995 | Ishida et al. | 369/59 |
| 5,473,591 | 12/1995 | Abe | 369/59 |

*Primary Examiner*—Nabil Z. Hindi
*Attorney, Agent, or Firm*—Fish & Richardson, P.C.

[57] ABSTRACT

An encoded digital signal reproducing apparatus in which a read signal from a recording medium is compared with each of thresholds different from each other to generate at least two binary-coded signals. When a first predetermined code train pattern is detected from one of the two binary-coded signals and a second predetermined code train pattern is simultaneously detected from the other of the two binary-coded signals, a frame synchronization detection signal is generated. A data signal is then decoded from the read signal on the basis of the timing at which the frame synchronization detection signal is generated. Thus, the probability of erroneous detection of the frame synchronization signal is reduced even with a high recording density, thus making it possible to correctly detect the frame synchronization signal.

3 Claims, 12 Drawing Sheets

| BIT NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| FIRST PATTERN | x | x | 1 | 1 | 1 | 1 | 1 | 1 | x | x | x | x | x | x | x | x | x | x |
| SECOND PATTERN | 0 | 1 | 1 | 1 | 1 | 1 | 1 | 1 | 1 | 0 | 0 | 0 | 0 | 0 | 0 | 0 | 0 | 1 |
| THIRD PATTERN | x | x | x | x | x | x | x | x | x | 0 | 0 | 0 | 0 | 0 | 0 | x | x | |

| BIT NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| FIRST PATTERN | x | x | 1 | 1 | 1 | 1 | x | x | x | x | x | x | x | x | x | x |
| SECOND PATTERN | 1 | 1 | 1 | 1 | 1 | 1 | 1 | 1 | 0 | 0 | 0 | 0 | 0 | 0 | 0 | 0 |
| THIRD PATTERN | x | x | x | x | x | x | x | x | x | 0 | 0 | 0 | 0 | x | x | x |

| BIT NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SECOND PATTERN | 1 | 1 | 1 | 1 | 1 | 1 | 1 | 1 | 0 | 0 | 0 | 0 | 0 | 0 | 0 | 0 |
| FOURTH PATTERN | x | x | 1 | 1 | 1 | 1 | x | x | x | x | 1 | 1 | 1 | 1 | x | x |

APPARATUS FOR REPRODUCING AN ENCODED DIGITAL SIGNAL BASED ON A FRAME SYNCHRONIZATION SIGNAL

BACKGROUND OF THE INVENTION

1. Field of the Invention

The present invention relates to a digital signal reproducing apparatus, and more particularly to an apparatus for reproducing an encoded digital signal which decodes an encoded data signal, on the basis of a frame synchronization signal, from a read signal derived by playing a recording medium on which the frame synchronization signal is recorded as encoded digital signals together with the encoded data signal.

2. Description of the Related Art

For correctly reproducing a digital signal from a read signal by playing a recording medium on which encoded digital signals are recorded, it is known that the frame synchronization must be obtained. For the frame synchronization, a synchronization pattern consisting of a code train, which does not exist in any code train patterns of data signals modulated for recording, is recorded at the head of each frame, and the synchronization pattern is detected as a frame synchronization signal from a read signal upon reproduction and used as the basis for reading and decoding data signals.

For example, in an optical disc which employs a (1, 7) modulation as a modulation scheme, data patterns are created with a minimal inversion interval being defined to be 2T (T is a bit interval) and a maximal inversion interval to be 8T. The frame synchronization pattern may be selected to be a pattern composed of repetition of maximal inversion intervals which will never appear in the data patterns. In an optical disc of a sampled servo system, the frame synchronization pattern is defined to have a length equal to a maximal inversion interval plus 1T.

Figure 1:
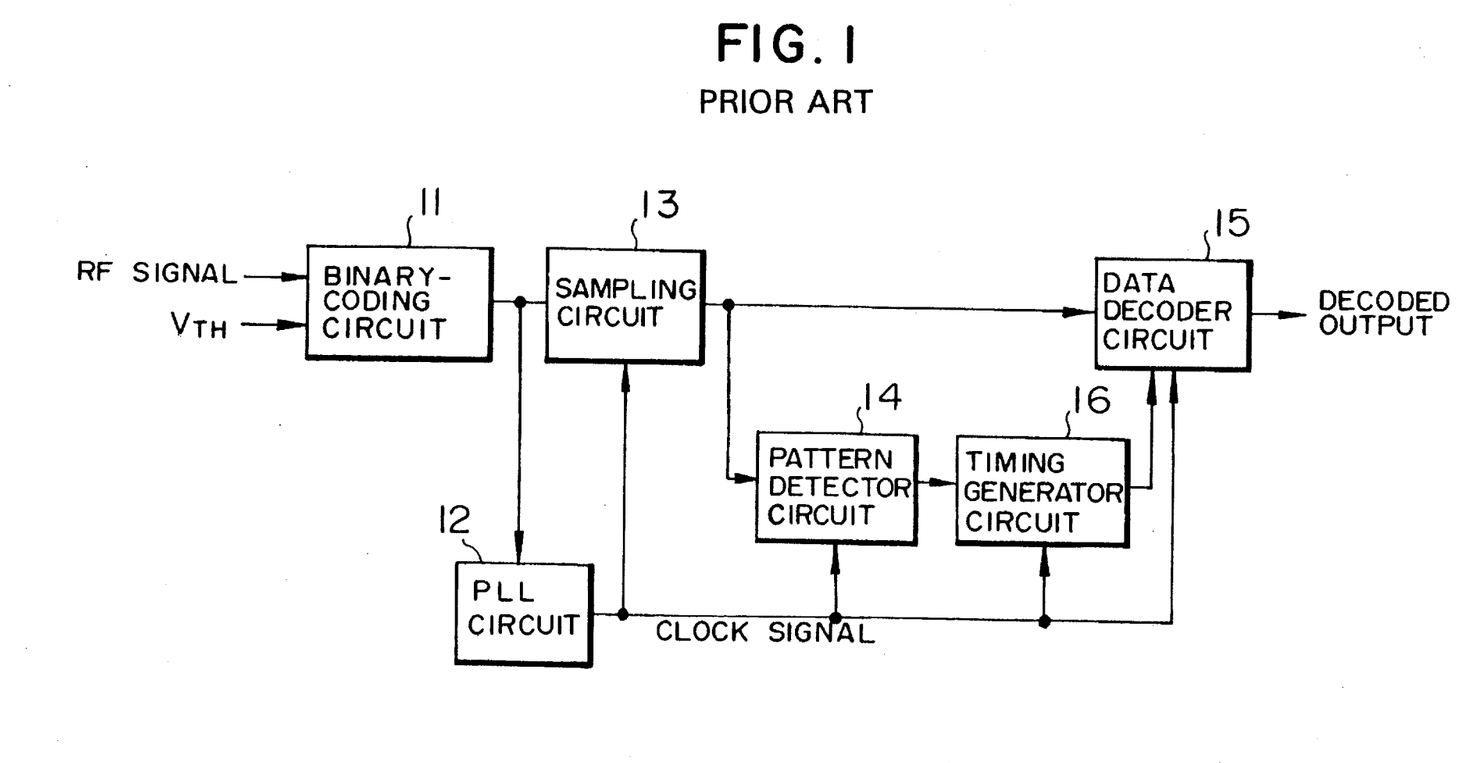
FIG. 1 is a block diagram showing an example of the arrangement of an apparatus for reproducing an encoded digital signal.
Figure 2A:
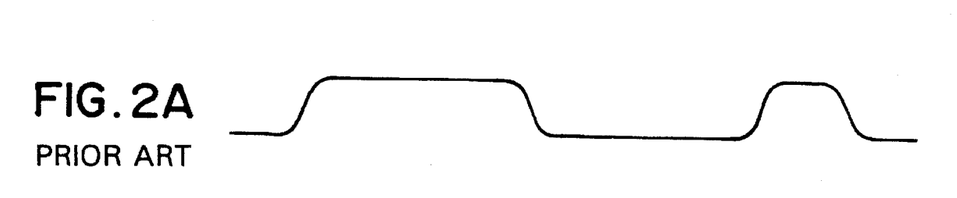
FIGS. 2A–2D are waveform charts representing the operations of various parts in the apparatus shown in FIG. 1.
Figure 2B:
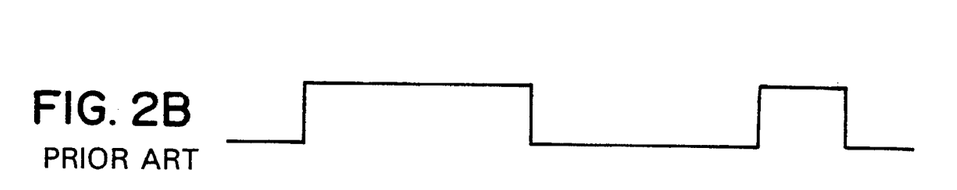
Figure 2C:
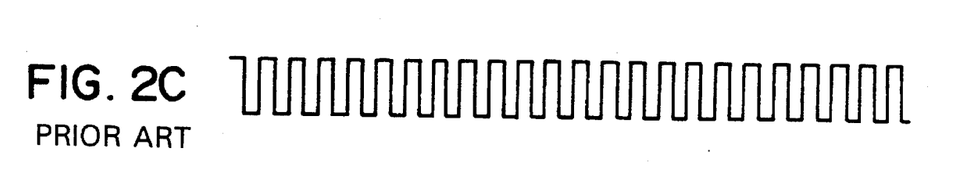
Figure 2D:
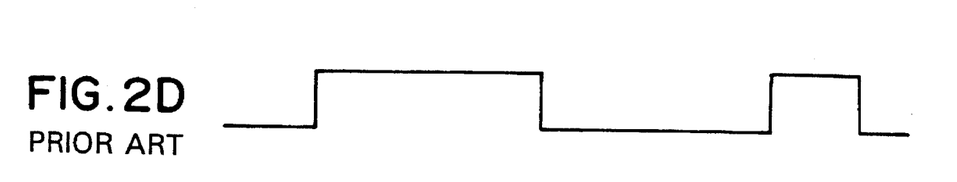
Figure 3:
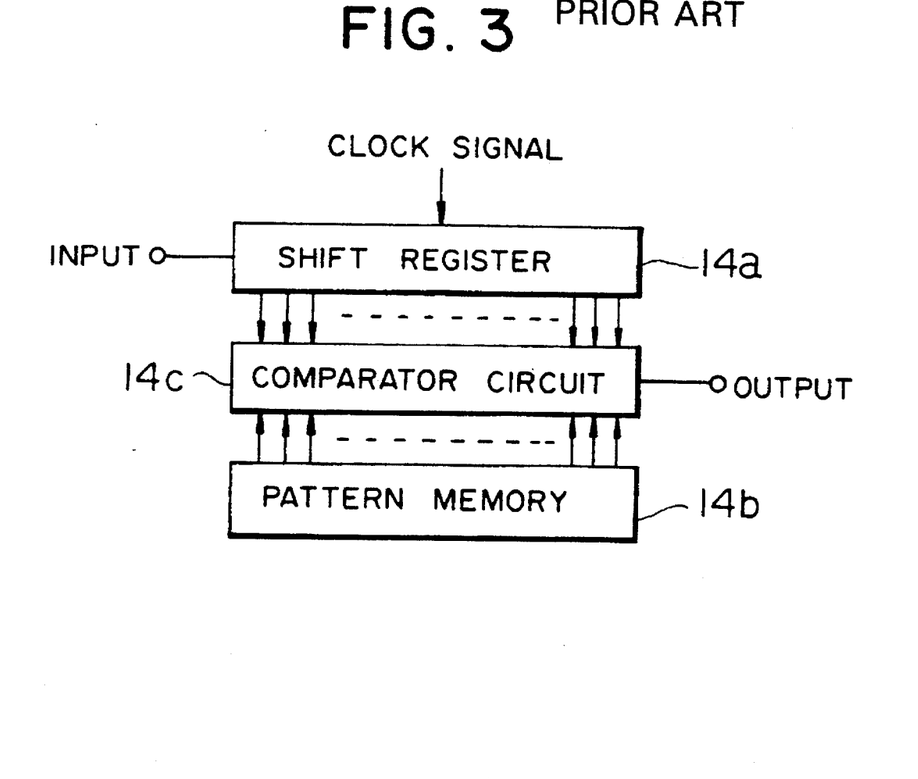
FIG. 3 is a block diagram showing a specific arrangement of a pattern detector circuit employed in the apparatus illustrated in FIG. 1.

It can be thought that a reproducing apparatus for reproducing a digital signal on the basis of a read signal from a recording medium on which the frame synchronization pattern as described above is recorded together with data patterns is arranged, for example, as shown in FIG. 1. In this reproducing apparatus, an RF (Radio Frequency) signal, which is a read signal output from a pickup (not shown), is supplied to a binary-coding circuit 11. The binary-coding circuit 11 generates a binary-coded signal by comparing an RF signal having a waveform as shown in FIG. 2A with a slice level $V_{TH}$ used as a threshold. The binary-coded signal having a waveform as shown in FIG. 2B is supplied to a PLL (Phase Locked Loop) circuit 12 as well as to a sampling circuit 13. The PLL circuit 12 generates a clock signal (FIG. 2C) which is synchronized with edges of the binary-coded signal, such that the sampling circuit 13 performs a sampling operation in response to the clock signal in order to generate a signal having a waveform as shown in FIG. 2D. The output signal of the sampling circuit 13 is supplied to a pattern detector circuit 14 and a data decoder circuit 15. The pattern detector circuit 14, as shown in FIG. 3, comprises a shift register 14a which receives and holds a sampled signal bit by bit in synchronism with the clock signal, a pattern memory 14b for previously recording the synchronization pattern signal derived by the frame synchronization pattern, and a comparator circuit 14c for generating a pattern detection signal when a signal held in the shift register 14a is coincident with the synchronization pattern signal output from the pattern memory 14b.

The pattern detection signal output from the pattern detector circuit 14 is supplied to a timing generator circuit 16 which generates a timing signal to a decoder circuit 15 in response to the pattern detection signal. The decoder circuit 15 decodes digital data from an output signal of the sampling circuit 13 in accordance with the timing signal and the clock signal.

It should be noted that the respective waveforms shown in FIG. 2A–2D are based on a synchronization pattern signal composed of "1" for 8T and the next "0" for 8T, where 8T is a maximal inversion interval.

Figure 4:
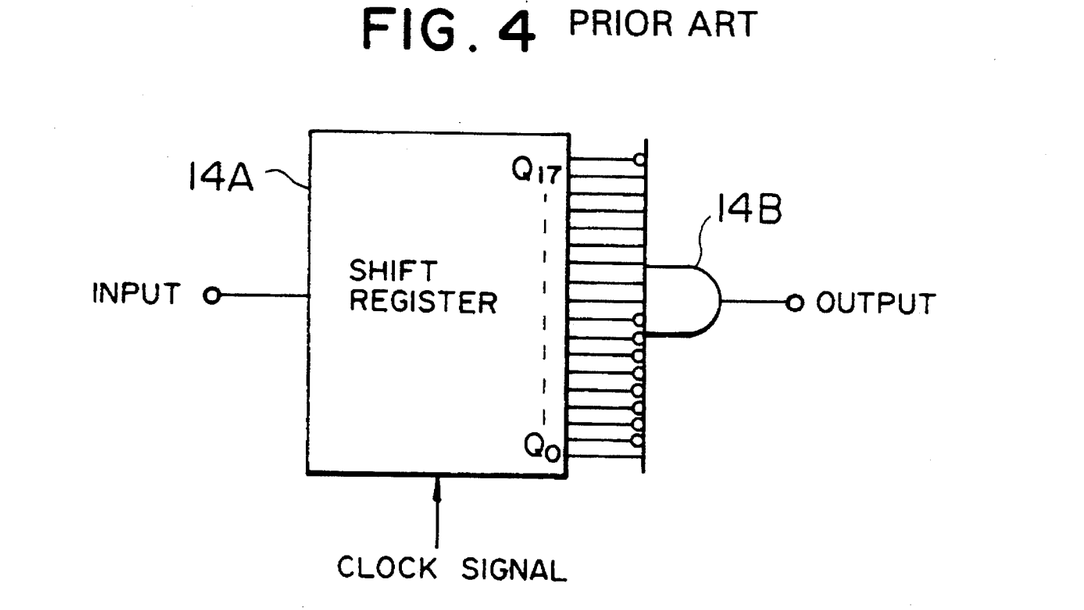
FIG. 4 is a block diagram showing another specific arrangement of the pattern detector circuit.

FIG. 4 shows an exemplary arrangement of the pattern detector circuit 14 which comprises a shift register 14A and an AND circuit 14B.

Figure 5A:
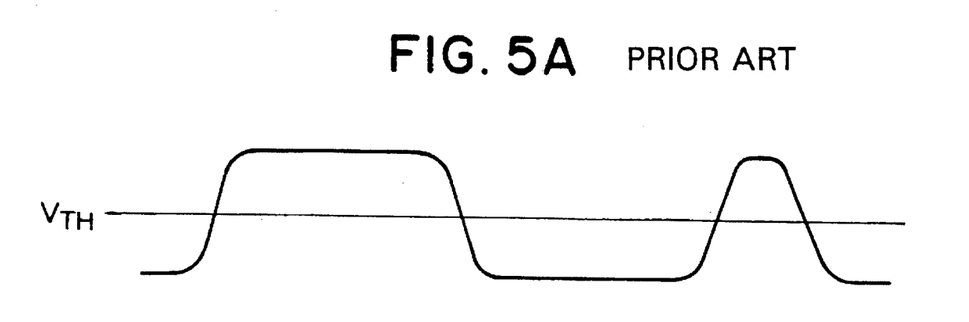
FIGS. 5A–5C are waveform charts showing how a frame synchronizing signal is detected in different recording densities.
Figure 5B:
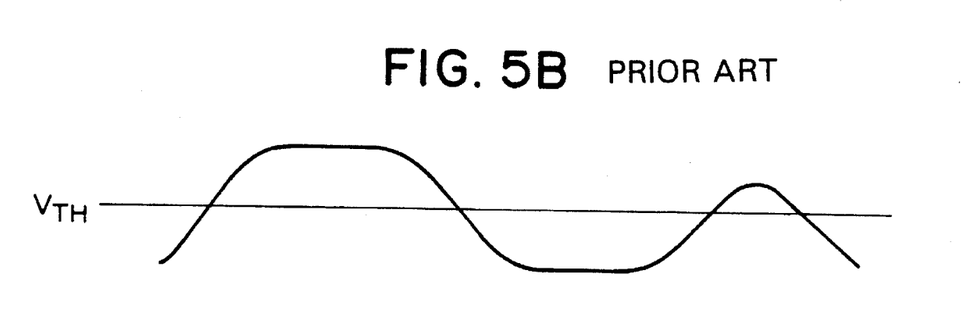
Figure 5C:
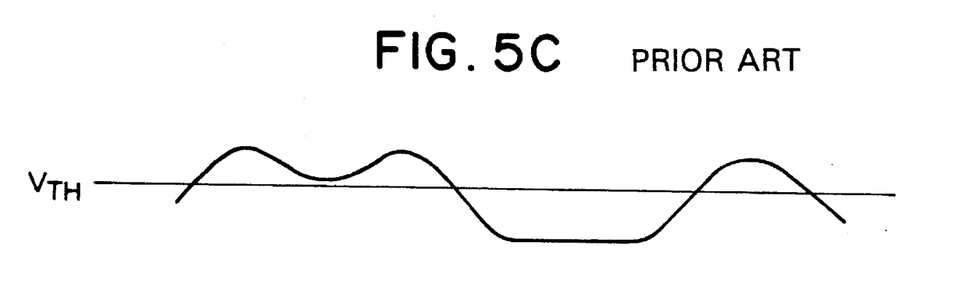

In the reproducing apparatus which detects the frame synchronization signal from a binary-coded waveform as described above, although an RF signal is obtained as a waveform which relatively abruptly changes as shown in FIG. 5A when a recording density on a recording medium is low, the RF signal is derived as a waveform which slowly changes as shown in FIG. 5B when the minimal inversion interval is narrow and hence the recording density on the recording medium is high. In the latter case, if the slice level is offset or if large noise is introduced into the slice level, the frame synchronization signal is more susceptible to erroneous detection. FIG. 5C shows an example in which an RF signal read from a high-density recording medium is output from the binary-coding circuit as a binary-coded signal composed of 8T of "1" and 8T of "0", which however should be read as being composed of 2T of "0", 3T of "1", and 8T of "0" in this order. In the event, the frame synchronization signal is erroneously detected.

SUMMARY OF THE INVENTION

It is therefore an object of the present invention to provide an apparatus for reproducing an encoded digital signal which is capable of preventing erroneous detection of a frame synchronization signal even if the recording density is high on a recording medium.

An apparatus for reproducing an encoded digital signal according to the present invention comprises frame synchronization detecting means for generating a frame synchronization detection signal when detecting a frame synchronization signal from a read signal derived by reading an encoded digital signal from a recording medium which contains the encoded digital signal recorded thereon including frame synchronization signals and encoded data signals divided into frames by the frame synchronization signals, the frame synchronization signal having a code train pattern different from any of patterns appearing in the encoded data signals; and means for decoding the encoded data signal from the read signal on the basis of a timing at which the frame synchronization detection signal is generated, and is characterized in that the frame synchronization detecting means includes binary-coding means for comparing the read signal with each of thresholds, different from each other, to generate at least two binary-coded signals; first pattern detecting means for generating a first pattern detection signal when detecting a first predetermined code train pattern from one of the two binary-coded signals; second pattern detecting means for generating a second pattern detection signal when detecting a second predetermined code train pattern from the other of the two binary-coded signals; and means for generating the frame synchronization detection signal when both of the first and second pattern detection signals are generated.

In the apparatus for reproducing an encoded digital signal according to the present invention, at least two binary-coded signals are individually generated from a read signal from a recording medium by comparing the read signal with thresholds different from each other, the frame synchronization detection signal is generated when a first predetermined code train pattern is detected from one of the two binary-coded signals and a second predetermined code train pattern is simultaneously detected from the other of the two binary-coded signals, and a data signal is decoded from the read signal on the basis of the timing at which the frame detection signal is generated.

DESCRIPTION OF THE PREFERRED EMBODIMENTS

Embodiments of the present invention will hereinafter be described in detail with reference to the accompanying drawings.

Figure 6:
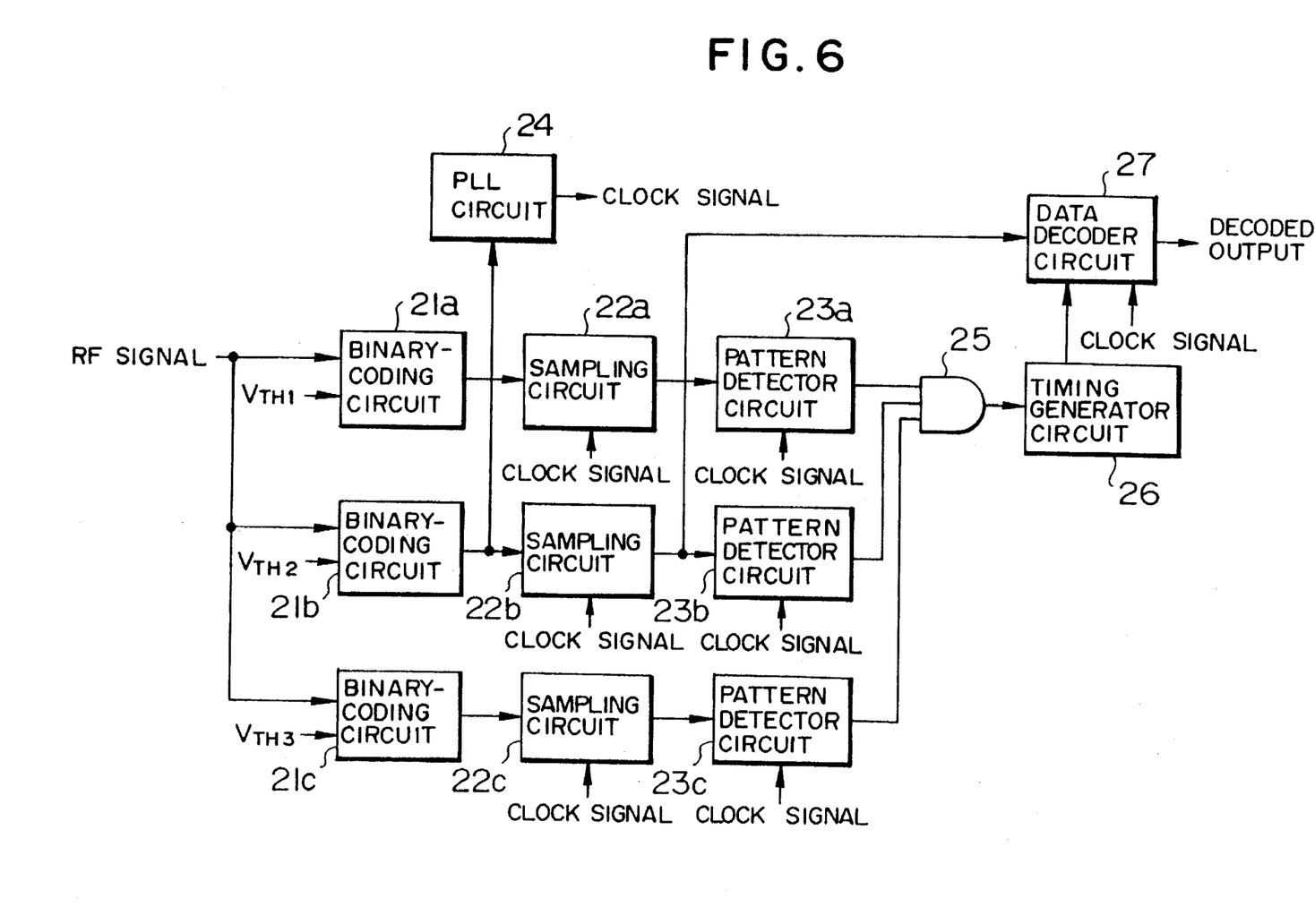
FIG. 6 is a block diagram showing an embodiment of the present invention.

FIG. 6 shows an apparatus for reproducing an encoded digital signal according to one embodiment of the present invention. In the reproducing apparatus, an RF signal output from a pickup (not shown) for reading digital data recorded on a recording medium such as an optical disk is supplied to three binary-coding circuits 21a–21c. The binary-coding circuits 21a–21c are also supplied with slice levels $V_{TH1}$, $V_{TH2}$, $V_{TH3}$, respectively, which are used as thresholds different from each other. These slice levels have a level relationship represented by $V_{TH1} > V_{TH2} > V_{TH3}$. The binary-coding circuit 21a is connected to a pattern detector circuit 23a through a sampling circuit 22a. Similarly, the binary-coding circuit 21b is connected to a pattern detector circuit 23b through a sampling circuit 22b, and the binary-coding circuit 21c is connected to a pattern detector circuit 23c through a sampling circuit 22c. The sampling circuits 22a–22c sample binary-coded signals from the corresponding binary-coding circuits 21a–21c in response to a clock signal, and supply sampled signals to the corresponding pattern detector circuits 23a–23c. Each of the pattern detector circuits 23a–23c is arranged, for example, as shown in FIG. 3, and generates a pattern detection signal when it detects a code train pattern equal to that previously stored in its pattern memory (not shown). The clock signal is generated in a PLL circuit 24 in response to a binary-coded signal from the binary-coding circuit 21b.

The pattern detector circuits 23a–23c are connected to an AND circuit 25 which generates a frame synchronization detection signal when all of the pattern detector circuits 23a–23c detect a frame synchronization pattern to generate the pattern detection signals. The AND circuit 25 is further connected to a timing generator circuit 26 which supplies a data decoder circuit 27 with a timing signal based on the timing at which the frame synchronization detection signal is generated.

The data decoder circuit 27, in response to the timing signal from the timing generator circuit 26, decodes a data signal from an output signal of the sampling circuit 22b in accordance with the clock signal.

Figure 7A:
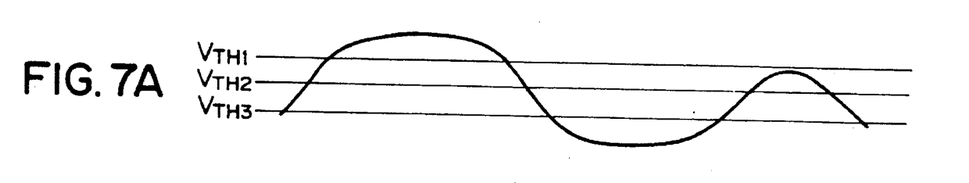
FIGS. 7A–7E are waveform charts representing the operations of various parts in the apparatus illustrated in FIG. 6.
Figure 7B:
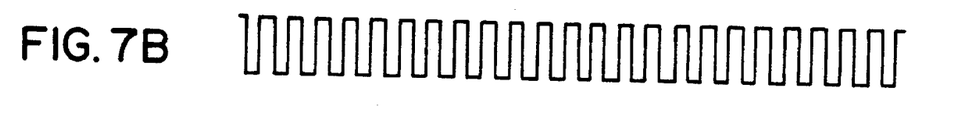
Figure 7C:
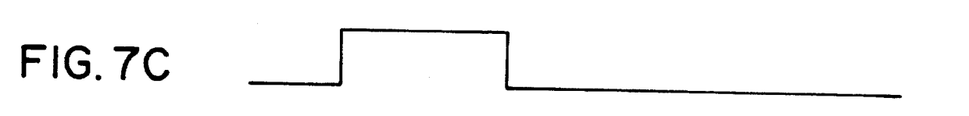
Figure 7D:
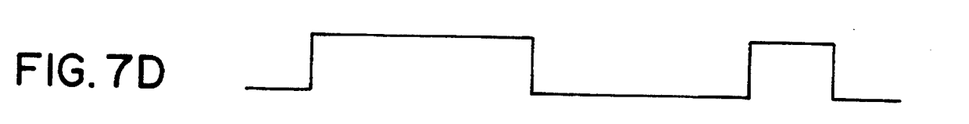
Figure 7E:
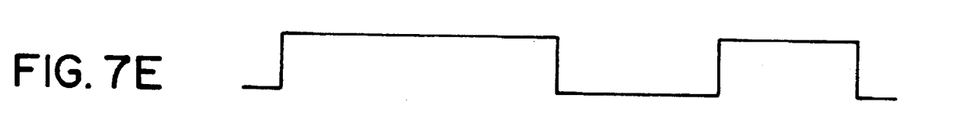

In the arrangement described above, when an RF signal having a level change as shown in FIG. 7A is output from the pickup, this RF signal is compared with the slice levels $V_{TH1}$, $V_{TH2}$, $V_{TH3}$ at the binary-coding circuits 21a–21c such that three binary-coded signals are generated. Since the respective binary-coded signals are sampled in the corresponding sampling circuits 22a–22c in response to a leading edge of the clock signal shown in FIG. 7B, respective output signals of the sampling circuits 22a–22c have waveforms as shown in FIGS. 7C–7E, respectively.

Figure 8:
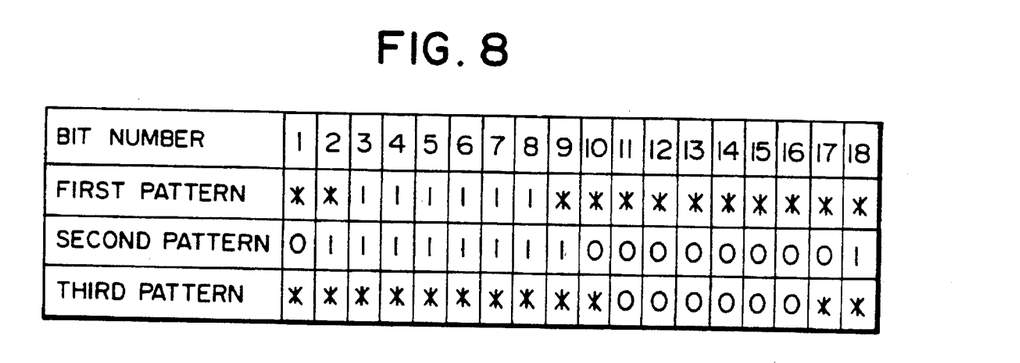
FIG. 8 is a table showing code train patterns stored in pattern memories.

Each of the pattern detector circuits 23a–23c generates the pattern detection signal when it detects assigned one of predetermined code train patterns different from each other, i.e., first–third patterns, from a signal supplied from the corresponding sampling circuit 22a–22c. As shown in FIG. 8, the first pattern assigned to be detected by the pattern detector circuit 23a includes six bits of "1" from the third to eighth bits within continued 18 bits of a serial signal from the sampling circuit 22a. The second pattern assigned to be detected by the pattern detector circuit 23b is the normal frame synchronization pattern itself (composed of 8T of "1" and the next 8T of "0"), wherein the first bit is "0", eight bits from the second to ninth bits are "1", another eight bits from the tenth to seventeenth bits are "0", and the eighteenth bit is "1". The third pattern assigned to be detected by the pattern detector circuit 23c has six bits of "0" from the eleventh to sixteenth bits within continued 18 bits of a serial signal from the sampling circuit 22c. In FIG. 8, a bit indicated by "*" means that it may be either "0" or "1".

The first–third patterns are determined on the assumption that the slice length of the read frame synchronization signal waveform uniformly changes corresponding to the slice levels $V_{TH1}$, $V_{TH2}$, $V_{TH3}$. Stated another way, the first and third patterns are determined with respect to the second pattern based on the fact that if the frame synchronization signal is read, the read signal level is higher than the slice level $V_{TH1}$ for a predetermined period within a period in which the read signal level is higher than the slice level $V_{TH2}$, and is lower than the slice level $V_{TH3}$ for a predetermined period within a period in which the signal level is lower than the slice level $V_{TH2}$.

When the pattern detector circuits 23a–23c simultaneously generate the pattern detection signals, the AND circuit 25 generates the frame synchronization detection signal which is supplied to the timing generator circuit 26. Thus, the timing signal is generated on the basis of the timing at which the frame synchronization detection signal is generated, and the data decoder circuit 27, in response to the timing signal, decodes a digital data signal from an output signal of the sampling circuit 22b in accordance with the clock signal.

Figure 9A:
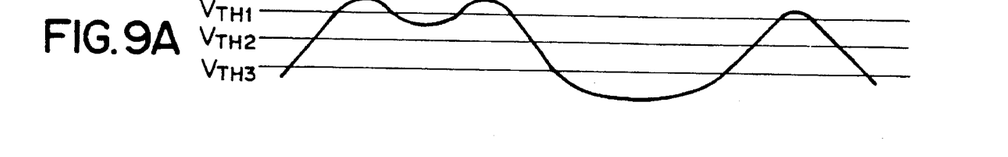
FIGS. 9A–9E are waveform charts representing the operations of various parts in the apparatus illustrated in FIG. 6 when a different RF signal is input.
Figure 9B:
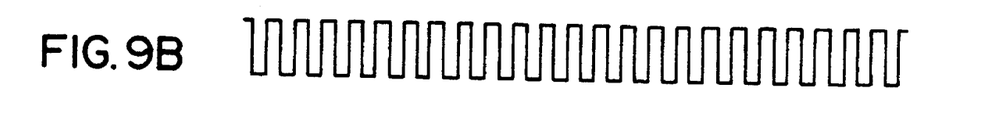
Figure 9C:
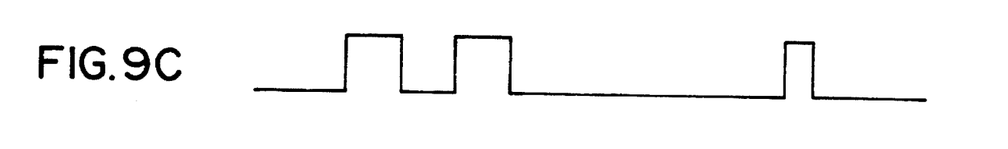
Figure 9D:
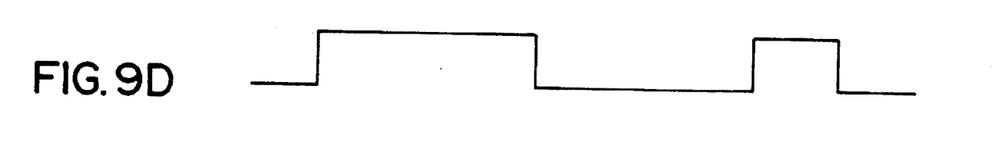
Figure 9E:
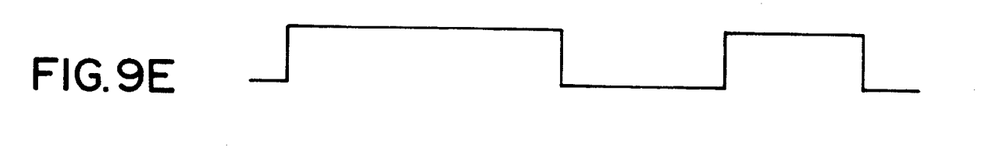

When the RF signal has changes as shown in FIG. 9A, the sampling circuits 22a–22c generate output signal waveforms as shown in FIGS. 9C–9E, respectively. FIG. 9B shows the waveform of the clock signal. In this example, since the output signals of the sampling circuits 22b, 22c are similar to those shown in FIGS. 7D and 7E, respectively, the pattern detector circuits 23b, 23c generate the pattern detection signals. However, since the pattern detector circuit 23a cannot detect the predetermined code train pattern, it does not generate the pattern detection signal. The AND circuit 25 does not generate the frame synchronization detection signal, thus preventing erroneous detection of the frame synchronization pattern.

It should be noted that while the pattern detection is performed by three circuit groups with three slice levels set therefor in the embodiment described above, the present invention is not limited to this specific arrangement. Alternatively, a plurality of slice levels, for example, two or four or more, may be set to the same number of pattern detection circuit groups in order to check incoming patterns for detecting the frame synchronization pattern.

It should also be noted that the slice levels and the code train patterns stored in the pattern memories of the pattern detector circuits are set in accordance with a format for the frame synchronization signal and the recording density of a recording medium.

Figure 10:
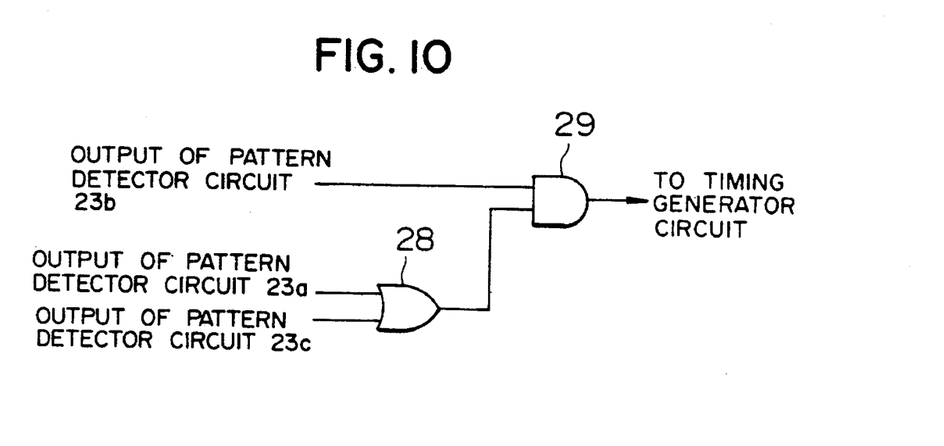
FIG. 10 is a logical circuit diagram showing a structure which may be used in place of an AND circuit in the apparatus illustrated in FIG. 6.

Further, while in the embodiment described above, output signals of the respective pattern detector circuits 23a–23c are supplied to the AND circuit 25 for detecting the frame synchronization pattern, a logical circuit such as a combination of an OR circuit 28 and an AND circuit 29, as shown in FIG. 10, may be used in place of the AND circuit 25.

Figure 11:
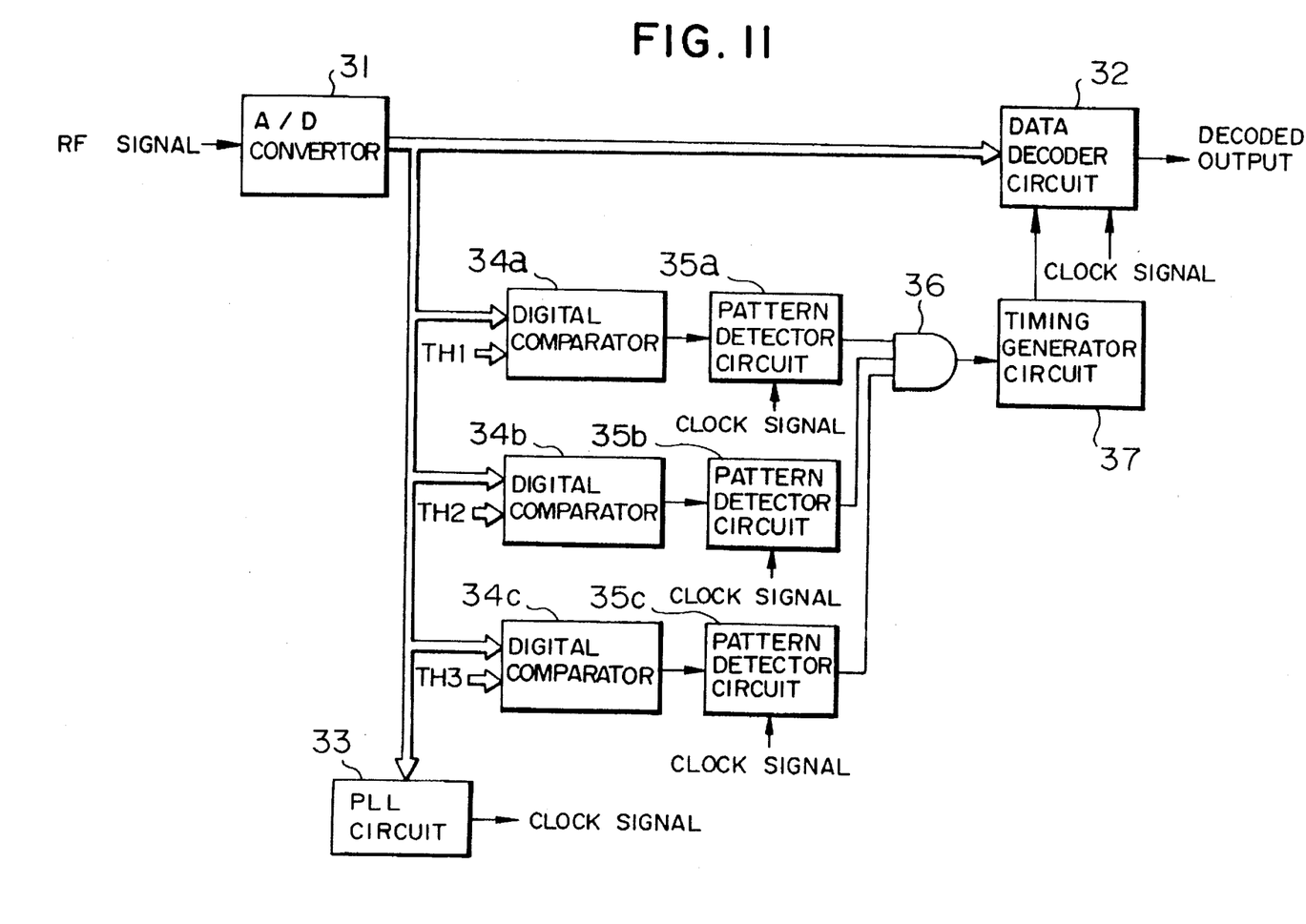
FIG. 11 is a block diagram showing another embodiment of the present invention.

FIG. 11 shows another embodiment of the present invention. In this embodiment, an RF signal is first converted to a digital signal by an A/D (analog-to-digital) convertor 31 and then supplied to a data decoder circuit 32, a PLL circuit 33, and comparators 34a–34c through a common bus. The A/D convertor 31 converts the RF signal to a digital signal in response to a clock signal generated from the PLL circuit 33. The digital RF signal is then compared with digital values TH1, TH2, TH3 indicative of slice levels $V_{TH1}$, $V_{TH2}$, $V_{TH3}$ in the digital comparators 34a–34c, so that binary-coded signals are generated from the respective comparators 34a–34c. The binary-coded signals are then supplied to corresponding pattern detector circuits 35a–35c, and processed by a arrangement similar to that shown in FIG. 6.

More specifically, each of the pattern detector circuits 35a–35c generates a pattern detection signal when it detects a predetermined code train pattern, which is different from those assigned to the other two, from a supplied binary-coded signal. The pattern detection signals from the respective pattern detector circuits 35a–35c are taken logical AND in a three-input AND circuit 36, and then, a output signal of the AND circuit 36 is supplied to a timing generator circuit 37. The timing generator circuit 37 generates a timing signal based on the timing at which a frame synchronization detection signal is generated from the AND circuit 36. The data decoder circuit 32, in response to the timing signal, decodes a data signal from the output digital signal of the A/D convertor 31 in accordance with the clock signal.

Figure 12:
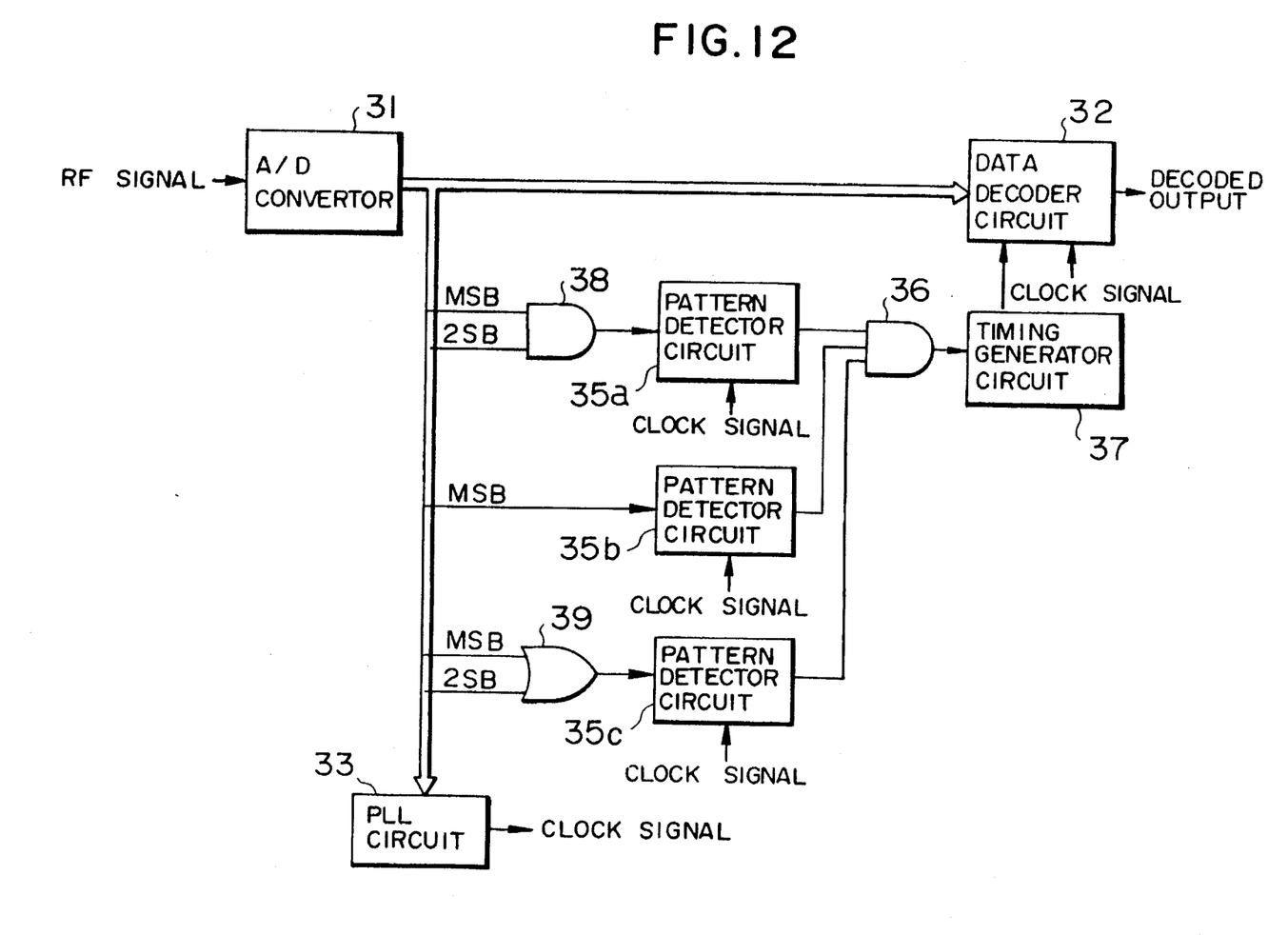
FIG. 12 is a block diagram showing a further embodiment of the present invention.

FIG. 12 shows a further embodiment of the present invention. The reproducing apparatus of this embodiment employs an AND circuit 38 and an OR circuit 39 in place of the digital comparators 34a–34c shown in FIG. 1. The AND circuit 38 takes logical AND of the upper two bits (MSB: Most Signification Digit, 2SB) of an output digital signal from an A/D convertor 31 composed of a plurality of bits, and supplies the resultant output signal to a pattern detector circuit 35a. The OR circuit 39 takes logical OR of the upper two bits of the output digital signal of the A/D convertor 31, and supplies the resultant output signal to a pattern detector circuit 35c. A pattern detector circuit 35b is supplied with the most significant bit of the output digital signal of the A/D convertor 31.

It is assumed, for example, that one byte of the output digital signal from the A/D convertor 31 is composed of eight bits so that "11111111" is a maximum value, and digital values TH1, TH2, TH3 corresponding to three slice levels are determined to be ¾, ½, and ¼ of the maximum value plus one. Then, "11000000" corresponds to ¾ or TH1; "10000000" to ½ or TH2; and "01000000" to ¼ or TH3. Therefore, when the upper two bits of an output digital signal show "11", the value of the output digital signal is "11000000" or more, so that the AND circuit 38 outputs "1". Otherwise, the value of the output digital signal is "11000000" or less, so that the AND circuit 38 outputs "0". When the most significant bit of the output digital signal shows "1", the value of the output digital signal is "10000000" or more. Conversely, when the most significant bit shows "0", the value is less than "10000000". Also, when the upper two bits of the output digital signal show either of "11", "10", and "01", the value of the output digital signal is "01000000" or more, so that the OR circuit 39 outputs "1". When the upper two bits show "00", the value is less than "01000000", so that the OR circuit 39 outputs "0".

Figure 13A:
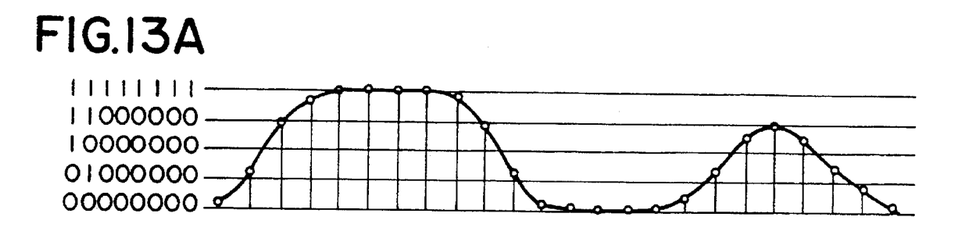
FIGS. 13A–13E are waveform charts representing the operations of various parts in the apparatuses illustrated in FIGS. 11 and 15.
Figure 13B:
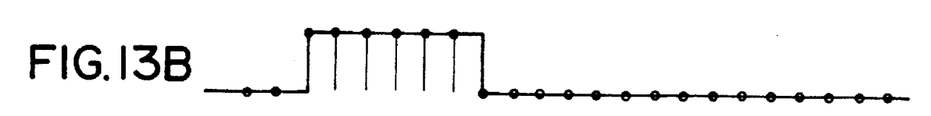
Figure 13C:
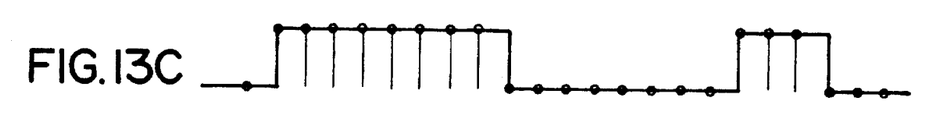
Figure 13D:
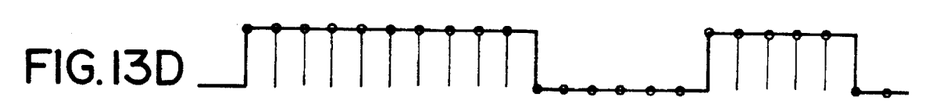
Figure 14:
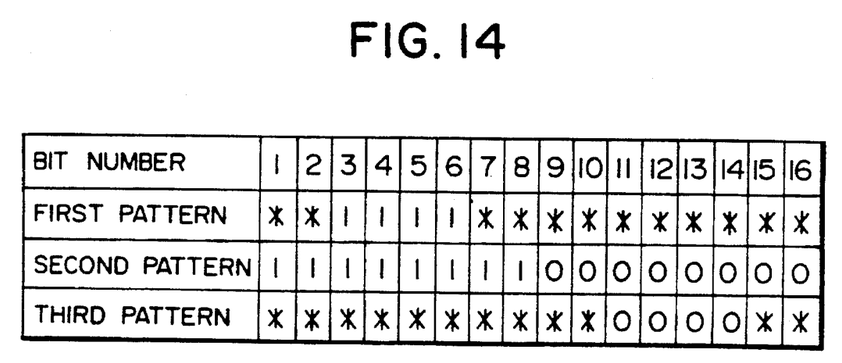
FIG. 14 is a table showing code train patterns stored in pattern memories.

When the output digital signal of the A/D convertor 31 changes as shown in FIG. 13A and is converted to binary-coded signals with the above-mentioned digital values TH1, TH2, TH3 used as thresholds, the pattern detector circuits 35a–35c are supplied with binary-coded signals as shown in FIGS. 13B–13D, respectively. In this case, for example as shown in FIG. 14, a first pattern assigned to be detected by the pattern detector circuit 35a has four bits of "1" from the third to sixth bits within continuous 16 bits of the binary-coded signal supplied thereto. A second pattern assigned to be detected by the pattern detector circuit 35b has eight bits of "1" from the first to eighth bits and eight bits of "0" from the ninth to sixteenth bits within continuous 16 bits of the binary-coded signal supplied thereto. A third pattern assigned to be detected by the pattern detector circuit 35c has four bits of "0" from the eleventh to fourteenth bits within continuous 16 bits of the binary-coded signal supplied thereto.

Outputs signals of the pattern detector circuits 35a–35c are taken logical AND in an AND circuit 36, and the resultant output signal of the AND circuit 36 is supplied to a timing generator circuit 37, as it is the case of the apparatus shown in FIG. 11. When the pattern detector circuits 35a–35c simultaneously generate the pattern detection signals, the AND circuit 36 generates the frame synchronization detection signal, resulting in generation of the timing signal based on the timing at which the frame synchronization detection signal is generated. The data decoder circuit 32, in response to the timing signal, decodes a data signal from the output signal of the A/D convertor 31 in accordance with the clock signal.

Figure 15:
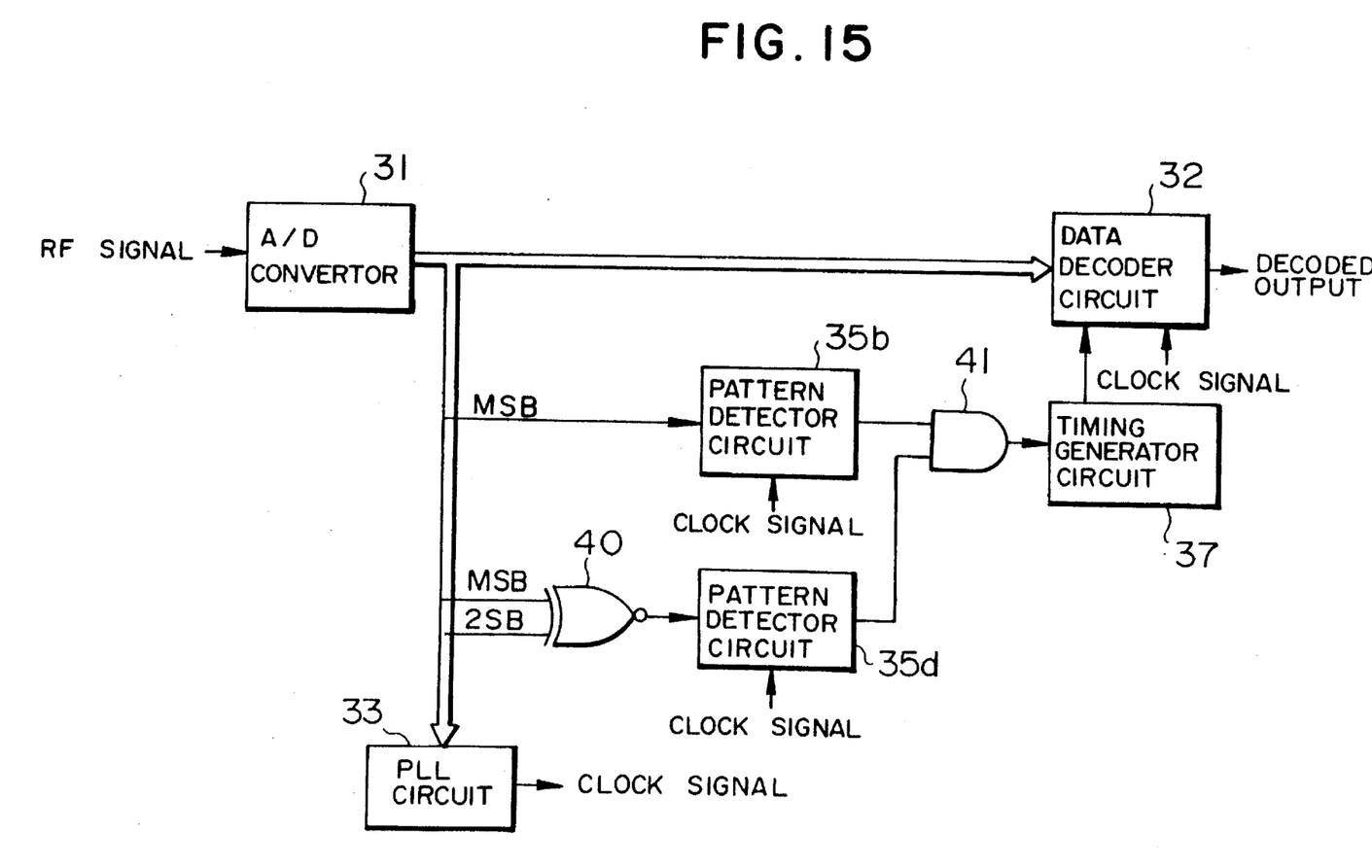
FIG. 15 is a block diagram showing a further embodiment of the present invention.

FIG. 15 shows a further embodiment of the present invention. The reproducing apparatus of this embodiment is not provided with the pattern detector circuits 35a, 35c, AND circuit 36, 38, and OR circuit 39 shown in the apparatus of FIG. 12, but is provided with an EX-NOR circuit 40, pattern detector circuit 35d, and two-input AND circuit 41 in place thereof. The EX-NOR circuit 40 takes logical exclusive NOR of the upper two bits of an output digital signal from an A/D convertor 31. The resultant output signal of the EX-NOR circuit 40 is supplied to the pattern detector circuit 35d. The AND circuit 41 takes logical AND of output signals of pattern detector circuits 35b, 35d, and supplies the resultant signal to a timing generator circuit 37.

Figure 13E:
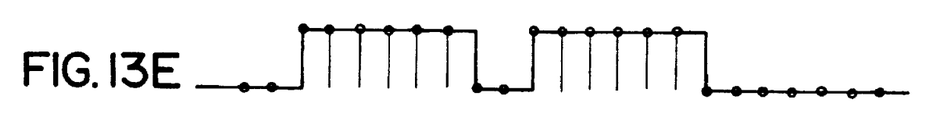
Figure 16:
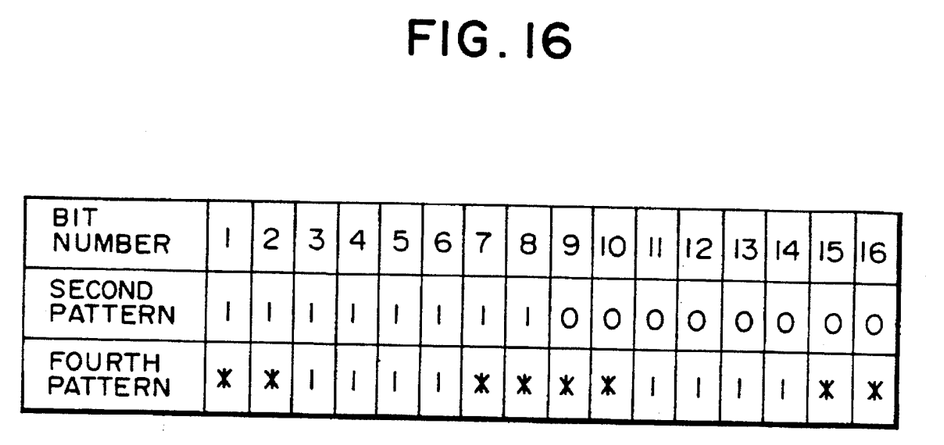
FIG. 16 is a table showing code train patterns stored in pattern memories.

Assuming that one byte of the output digital signal from the A/D convertor 31 is composed of eight bits, similarly to the previous embodiment, as the upper two bits of the output digital signal from the A/D convertor 31 is passed through the EX-NOR circuit 40, the EX-NOR circuit 40 outputs "1" when the value of the output digital signal is "11000000" or more or less than "01000000", and "0" when the value is less than "11000000" and "01000000" or more. When the output digital signal of the A/D convertor 31 presents changes as shown in FIG. 13A, the EX-NOR circuit 40 outputs a binary-coded signal as shown in FIG. 13E. The pattern detector circuit 35d, which is supplied with this binary-coded signal, generates the pattern detection signal when it detects a fourth pattern which, as shown in FIG. 16, is composed of continuous 16 bits of the binary-coded signal including four bits of "1" from the third to sixth bits and another four bits of "1" from the eleventh to fourteenth bits. Respective output signals from the pattern detector circuits 35b, 35d are taken logical AND in the AND circuit 41, and the resultant output signal of the AND circuit 41 is supplied to the timing generator circuit 37 which generates the timing signal for decoding data, as it is the cases of the respective embodiments described above.

As will be appreciated from the foregoing description, in the apparatus for reproducing an encoded digital signal according to the present invention, at least two binary-coded signals are individually generated from a read signal from a recording medium by comparing the read signal with thresholds different from each other, the frame synchronization detection signal is generated when a first predetermined code train pattern is detected from one of the two binary-coded signals and a second predetermined code train pattern is simultaneously detected from the other of the two binary-coded signals, and a data signal is decoded from the read signal on the basis of the timing at which the frame detection signal is detected, so that the probability of erroneous detection of the frame synchronization signal is reduced even with a high recording density, thus making it possible to correctly detect the frame synchronization signal. By using the frame synchronization signal correctly detected in this way, data signals can be stably reproduced.

What is claimed is:

1. An apparatus for reproducing an encoded digital signal comprising:

frame synchronization detecting means for generating a frame synchronization detection signal when detecting a frame synchronization signal from a read signal derived by reading an encoded digital signal from a recording medium which contains said encoded digital signal recorded thereon including frame synchronization signals and encoded data signals divided into frames by the frame synchronization signals, said frame synchronization signal having a code train pattern which is different from any patterns appearing in said encoded data signals; and means for decoding said encoded data signal form said read signal based on a timing at which said frame synchronization detection signal is generated;

wherein said frame synchronization detecting means includes a plurality of binary-coding means for comparing said read signal with a respective threshold signal of each said binary coding means, each said threshold signal is different from each other, to generate at least two binary-coded signals;

first pattern detecting means for generating a first pattern detection signal when detecting a first predetermined code train pattern from one of said two binary-coded signals;

second pattern detecting means for generating a second pattern detection signal when detecting a second predetermined code train pattern from the other of said two binary-coded signals; and means for generating said frame synchronization detection signal when both of said first and second pattern detection signals are generated.

2. An apparatus for reproducing an encoded digital signal according to claim 1, wherein each of said plurality of binary-coding means includes converting means for converting said read signal from an analog form to a digital form; and digital comparing means connected to said converting means.

3. An apparatus for reproducing an encoded digital signal according to claim 2, wherein said digital comparing means includes a logical gate circuit which is supplied with a plurality of upper bits of an output signal from said converting means.

* * * * *